Figure 1:
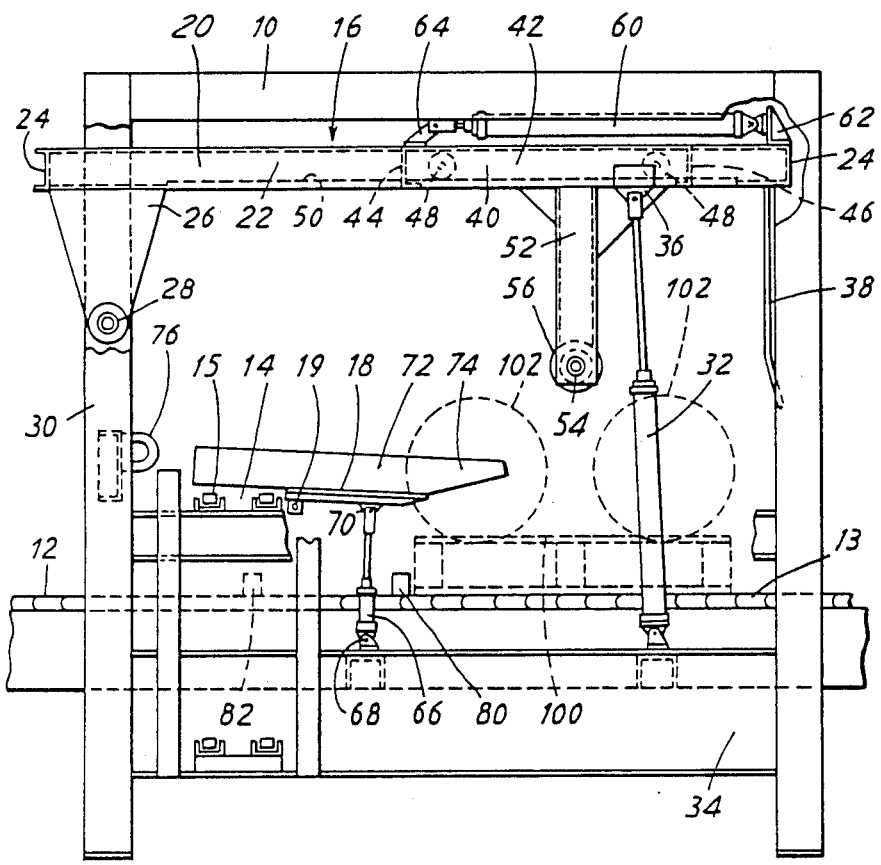

United States Patent [19]

Avey

[11] Patent Number: 4,632,633

[45] Date of Patent: Dec. 30, 1986

[54] APPARATUS FOR LOADING CYLINDRICAL ARTICLES ONTO PALLETS

[75] Inventor: Kenneth F. C. Avey, Epping, England

[73] Assignee: W&C Pantin Ltd., Epping, England

[21] Appl. No.: 675,935

[22] Filed: Nov. 28, 1984

[30] Foreign Application Priority Data

Oct. 25, 1984 [GB] United Kingdom ............... 8427037

[51] Int. Cl.[4] .......................................... B65G 65/00
[52] U.S. Cl. .................................... 414/787; 193/40;
    414/110; 414/417; 414/748
[58] Field of Search .............. 414/787, 416, 417, 330,
    414/110, 748, 39; 198/468.7, 429; 193/40, 32, 34

[56] References Cited

U.S. PATENT DOCUMENTS

| 3,182,779 | 5/1965 | Dillaha | 193/40 X |
|---|---|---|---|
| 3,667,621 | 6/1972 | Barlow | 193/40 X |
| 3,945,520 | 3/1976 | Harman | 414/417 |
| 4,003,462 | 1/1977 | Perrott | 414/748 X |
| 4,163,786 | 8/1978 | Tokuno | 414/110 X |
| 4,385,859 | 5/1983 | Goossens | 193/32 X |
| 4,478,327 | 10/1984 | Siniscal et al. | 193/40 |
| 4,516,900 | 5/1985 | Avey | 414/417 |

FOREIGN PATENT DOCUMENTS 2110729  9/1972  Fed. Rep. of Germany ...... 414/110

Primary Examiner—Joseph E. Valenza
Assistant Examiner—David A. Bucci
Attorney, Agent, or Firm—Louis Orenbuch

[57] ABSTRACT

An apparatus for loading cylindrical articles, such as kegs, onto a pallet so that the articles lie on their sides in a plurality of rows, has an assembly station at which rows of the articles are assembled at a level higher than the surface of a pallet at an adjacent loading station. A ramp extends from the assembly station to a pallet at the unloading station. A pusher mechanism pushes each row of articles at the assembly station onto the ramp so that the articles roll down the ramp under their own weight onto the pallet. A transfer member engages each row of articles on the ramp and controls the movement of the articles down the ramp. The transfer member is suspended from a carriage that is movable above the ramp. The carriage is movable vertically to enable it to engage each row, in turn, of articles pushed onto the ramp.

6 Claims, 8 Drawing Figures

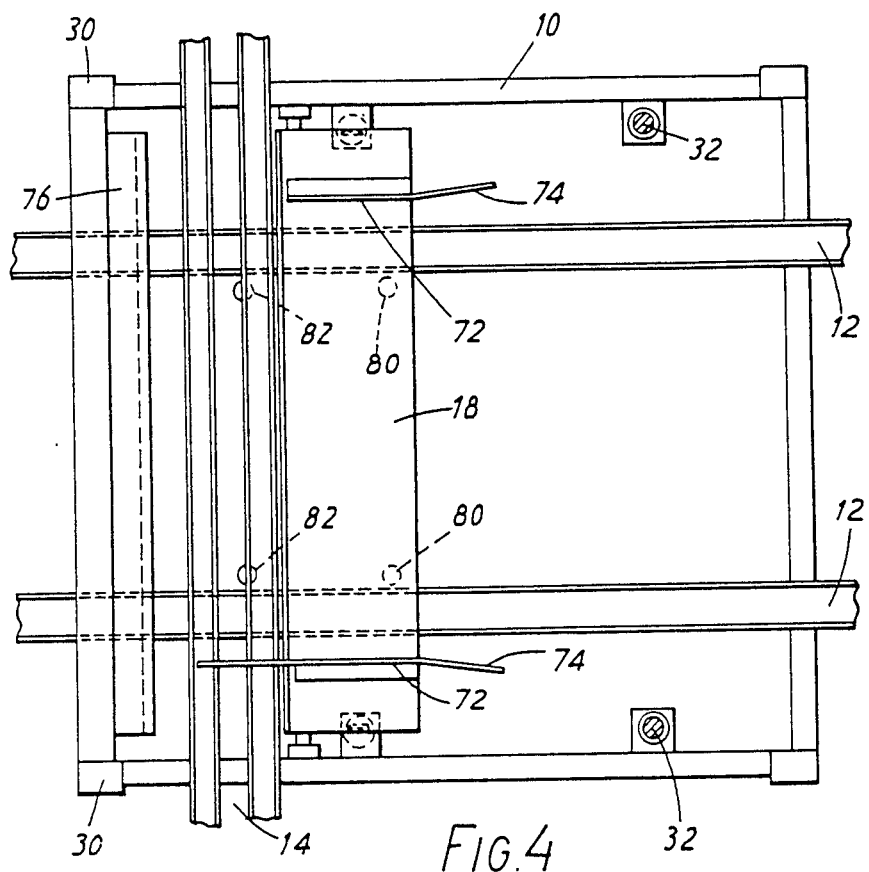
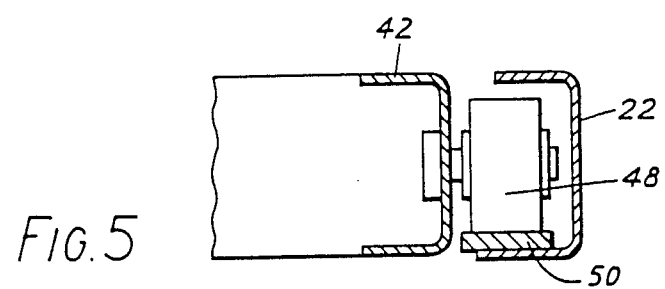

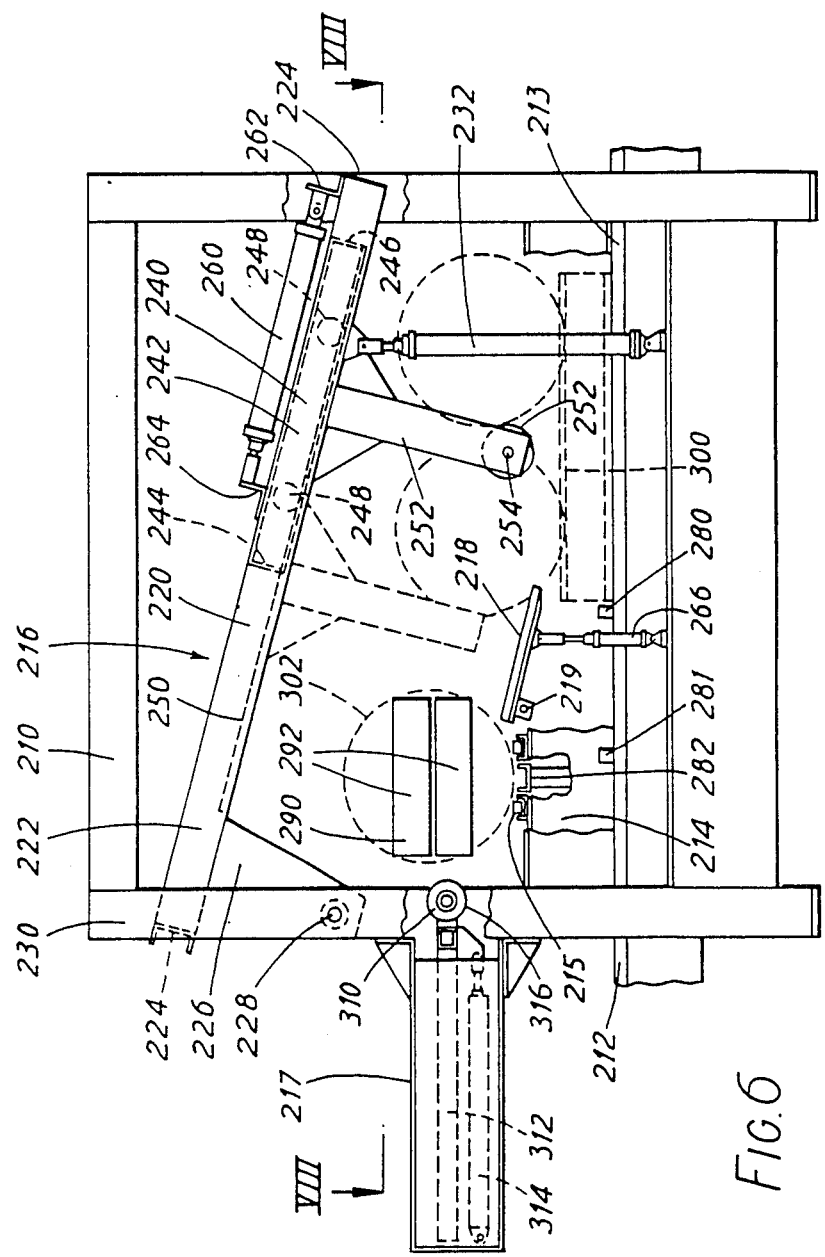

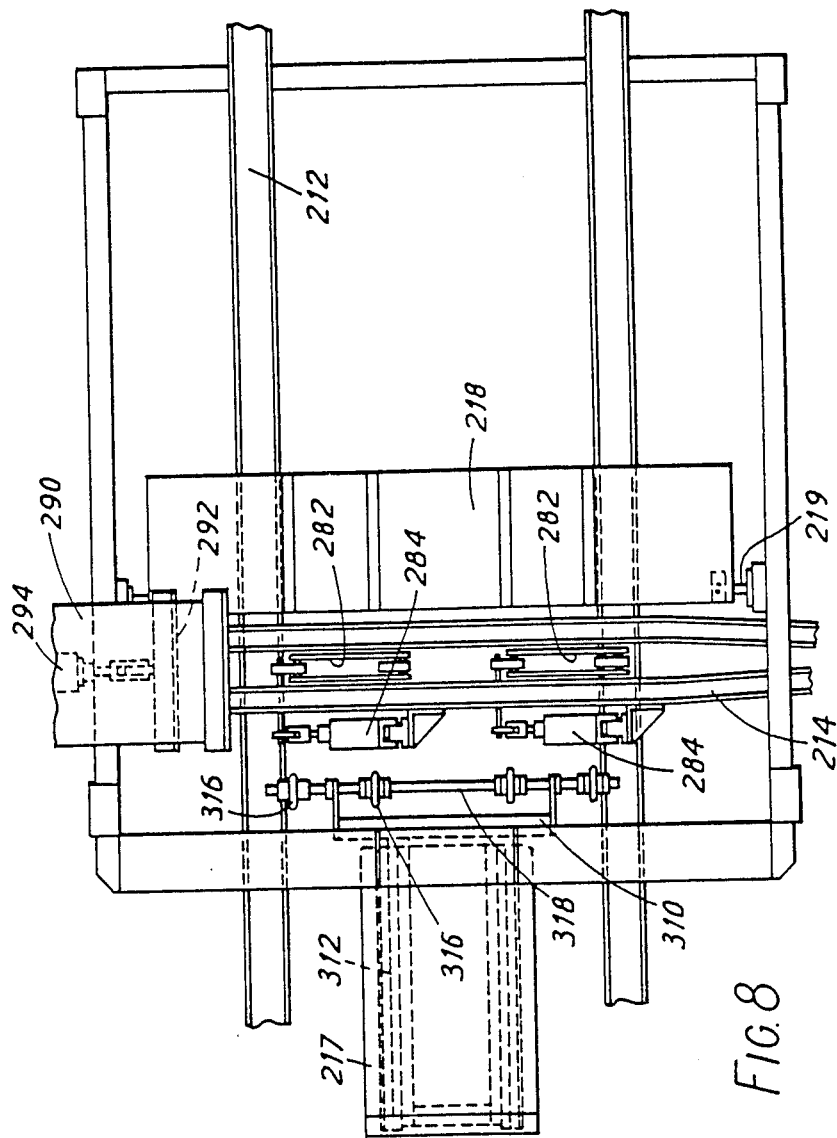

APPARATUS FOR LOADING CYLINDRICAL ARTICLES ONTO PALLETS

This invention relates to apparatus for loading onto a pallet, or unloading from a pallet, cylindrical articles such as kegs.

Apparatus for loading kegs onto a pallet is known in which the kegs are assembled on a stripping apron above the pallet, the apron being then withdrawn to drop the kegs onto the pallet. The shock loads applied to the kegs in such an apparatus can cause damage to the kegs and also generate a lot of noise in operation of the apparatus.

Apparatus for removing kegs from a pallet is known in which the kegs are pushed simultaneously from the pallet onto a discharge table. In such apparatus also, shock loads can be applied to the kegs, with the risk of damage to the kegs and increased noise of operation.

It is an object of this invention to provide improved apparatus for palletizing or depalletizing cylindrical articles such as kegs.

In accordance with one aspect of this invention, there is provided apparatus for removing cylindrical articles such as kegs from a pallet on which the articles are arranged in a plurality of rows, resting on their sides, the apparatus comprising means for moving a loaded pallet to an unloading station adjacent a discharge conveyor, and a transfer mechanism for moving the articles row by row from a pallet at the unloading station to the discharge conveyor, the transfer mechanism comprising a carriage movable towards and away from the discharge conveyor and also movable between a raised position and a lowered position, a pusher member suspended from the carriage being arranged when the carriage is in the lowered position to engage a row of articles on the pallet and when in the raised position to clear the articles on the pallet, and means for moving the carriage so that the pusher member is moved behind each row of articles in turn and to push the row of articles from the pallet onto the discharge conveyor.

Preferably, the carriage is mounted in a sub-frame so as to be movable relative to the sub-frame in a direction towards and away from the discharge conveyor, and the sub-frame is pivotable about a horizontal axis at right angles to such movement of the carriage to effect up and down movement of the carriage.

Suitably, the pusher member carries freely rotatable rollers through which the articles are engaged.

Preferably, the means for moving a loaded pallet to the unloading station is a conveyor extending at right angles to the discharge conveyor and means are provided for arresting movement of a pallet on the conveyor at a plurality of predetermined positions, in each of which a respective row of articles on the pallet is positioned to be engaged by the pusher member of the transfer mechanism.

In accordance with a preferred feature of the invention, a bridge member is provided on which each row of articles can roll from the pallet to the discharge conveyor, the bridge member being movable between an operative position in which it engages the upper face of a pallet at the unloading station and a raised position in which it is clear of the pallet. Preferably, the discharge conveyor is positioned at a level higher than that of the upper face of a pallet at the unloading station, and the bridge member in its operative position forms a ramp sloping upwards from the pallet to the discharge conveyor.

The bridge member may act not only to bridge the gap between a pallet and the discharge conveyor but also to assist holding the pallet stationary as the articles are pushed onto the bridge member.

In accordance with another aspect of the invention, there is provided apparatus for loading cylindrical articles such as kegs onto a pallet so that the articles lie on their sides in a plurality of rows, the apparatus comprising means for moving an empty pallet to a loading station, means for assembling a row of articles at an assembly location adjacent the loading station and at a level higher than the upper surface of a pallet at the loading station, a ramp arranged to extend from the assembly location to a pallet at the unloading station, pusher means for pushing a row of articles at the said location onto the ramp so that the articles roll down the ramp under their own weight onto the pallet, and a transfer mechanism comprising a transfer member adapted to engage articles on the ramp and to control the movement of articles down the ramp and means for moving the transfer member so as to engage in turn each row of articles pushed onto the ramp.

Preferably, the transfer means is suspended from a carriage movable towards and away from the said assembly location, and also movable between a lowered position in which the transfer member can engage articles on the ramp and a raised position in which the transfer member is clear of articles on the ramp and on a pallet at the unloading station.

Suitably, the carriage is mounted in a sub-frame so as to be movable relative to the sub-frame in a direction towards and away from the said assembly location, and the sub-frame is pivotable about a horizontal axis at right angles to such movement of the carriage to effect up and down movement of the carriage.

The means for assembling a row of articles at the assembly location may comprise an infeed conveyor on which articles are carried to the said location.

The means for moving an empty pallet to the loading station is preferably a conveyor extending at right angles to the infeed conveyor, and means are provided for arresting movement of a pallet on the conveyor at a plurality of predetermined positions, in each of which the pallet is positioned to receive a respective row of articles from the ramp.

Advantageously, the ramp is movable between an operative position in which it engages the upper face of a pallet at the loading station and a raised position in which the ramp is clear of the pallet. The ramp may assist in holding the pallet stationary as the articles roll onto the pallet from the ramp.

Figure 2:
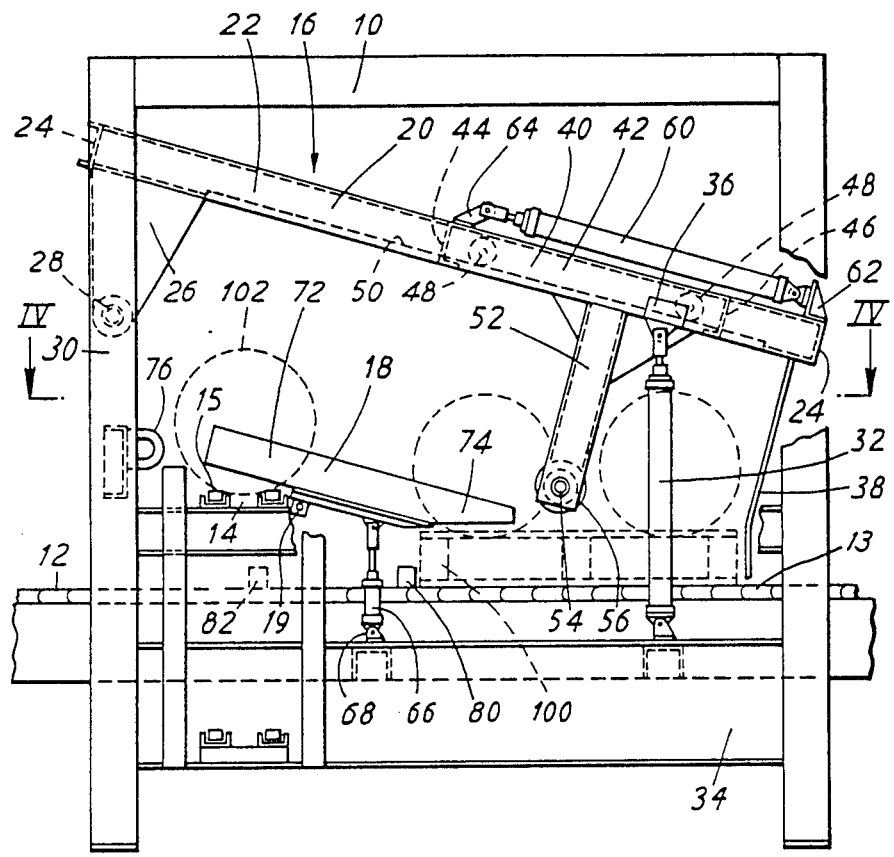
Figure 3:
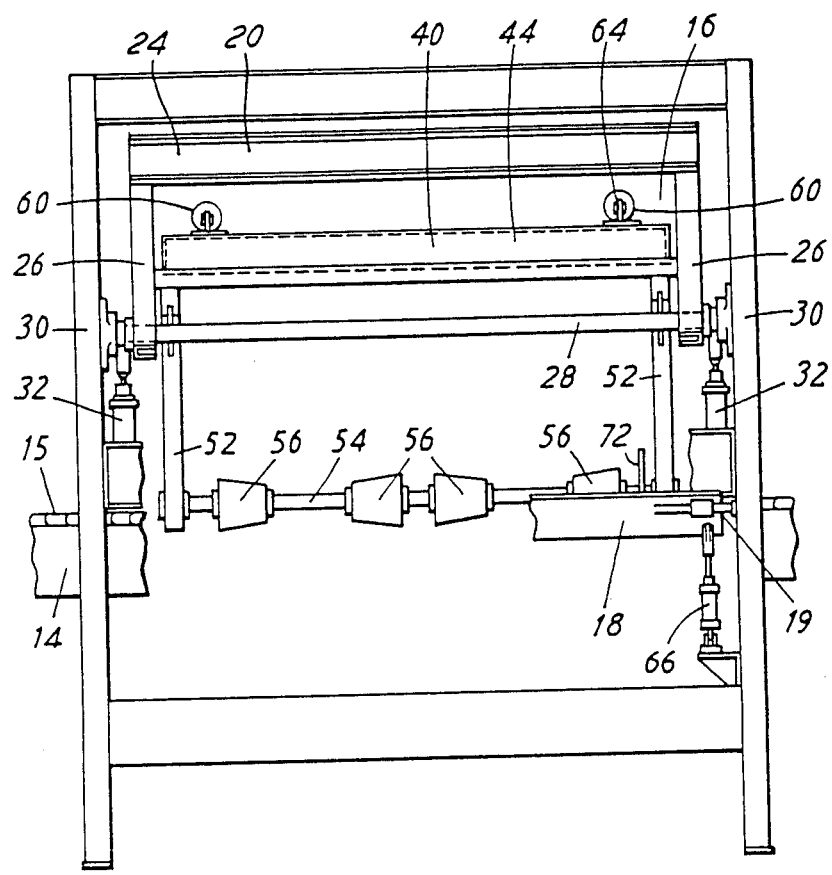
Figure 7:
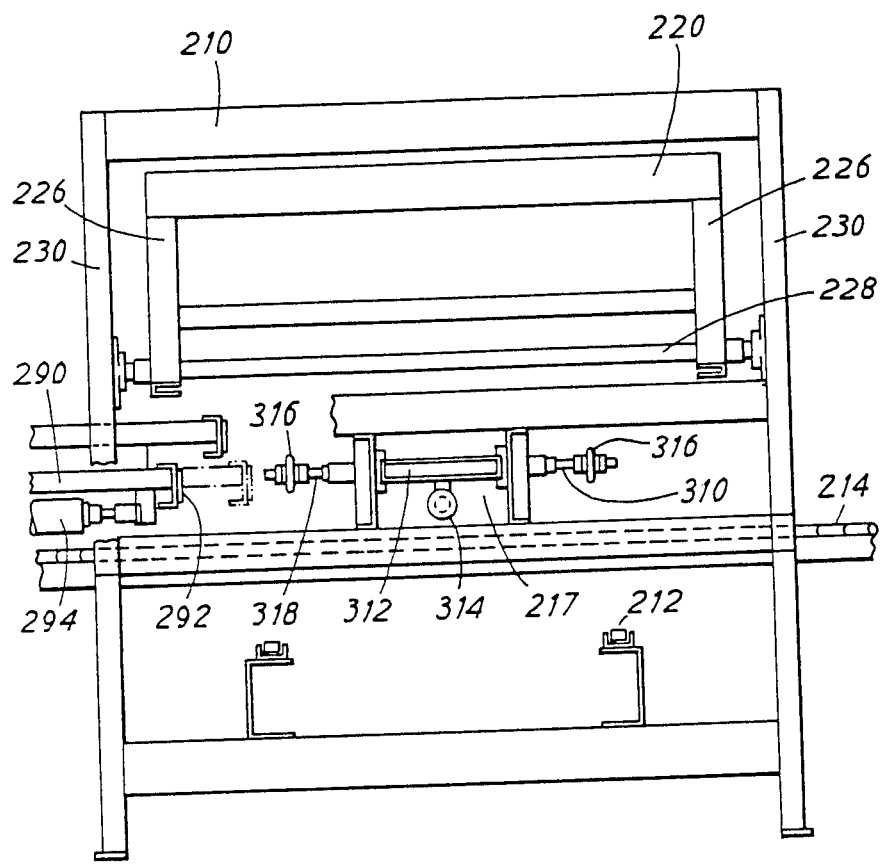

The invention will now be described, by way of example, with reference to the accompanying drawings, in which:

FIG. 1 is a side elevation of apparatus for removing kegs from a pallet in accordance with the invention, showing the transfer mechanism and ramp in the raised position, FIG. 2 is a view similar to FIG. 1, but showing the transfer mechanism and ramp in the lowered position, FIG. 3 is an end elevation of the apparatus, looking from the left of FIG. 2, FIG. 4 is a section on line IV—IV of FIG. 2, FIG. 5 is a fragmentary cross-section through a side member of a carriage of the apparatus, FIG. 6 is a side elevation of apparatus for loading kegs onto a pallet in accordance with the invention, FIG. 7 is an end elevation of the apparatus of FIG. 6, and FIG. 8 is a section on line VIII—VIII of FIG. 6.

Referring to FIGS. 1 to 5, apparatus for removing cylindrical articles such as kegs from a pallet comprises a main frame 10, a pallet conveyor 12 on which pallets are moved to and from an unloading station, a keg conveyor 14 on which kegs are discharged from the apparatus, a transfer mechanism 16 for transferring kegs from a pallet at the unloading station to the keg conveyor 14, and a ramp 18 bridging the gap between the pallet and the keg conveyor 14. The illustrated apparatus is designed to remove kegs 102 from a pallet 100 on which the kegs are arranged in two rows of two, lying on their sides.

The pallet conveyor 12 is a chain conveyor having an upper horizontal run 13 extending through the unloading station. Two stop mechanisms, such as peg stops 80 and 82, are provided to arrest each loaded pallet 100 at respective first and second positions at the unloading station. In the first position the first two of kegs 102 on the pallet is adjacent the ramp 18, whilst in the second position the second row of kegs is adjacent the ramp 18.

The keg conveyor 14 is a chain conveyor having a pair of chains extending in an upper horizontal run 15 and arranged to that kegs lying on their sides can be transported by the chains. The upper run 15 of the keg conveyor 14 extends at right angles to the pallet conveyor 12 at one side of the unloading station, and is at a level higher than that of the pallet conveyor 12, so that each empty pallet can be carried beneath the upper run of the keg conveyor as it is discharged from the apparatus. A buffer 76 of resilient material extends along one side of the conveyor 14, to prevent kegs moving too far as they are pushed onto the conveyor 14 by the transfer mechanism 16. The mechanisms for guiding and driving the chains of the pallet conveyor 12 and keg conveyor 14 can be of well known form and will not be described further.

The transfer mechanism 16 comprises a sub-frame 20 consisting of a rectangular framework having channel-section side members 22 joined by cross-members 24. At one end the sub-frame 20 has two downwardly extending legs 26 by means of which the sub-frame 20 is pivotally supported on a horizontal pivot shaft 28 extending between two uprights 30 of the main frame 10. The sub-frame 20 can be moved between a raised position, shown in FIG. 1, and a lowered position, shown in FIG. 2, by means of two air cylinders 32 acting between the main frame 10 and the sub-frame 20 near the end of the sub-frame 20 remote from the pivot shaft 28. Each air cylinder is pivoted to a horizontal side member 34 of the main frame 10 and has its piston rod pivotably connected to a bracket 36 fixed to one of the side members 22 of the sub-frame 20. A guard plate 38 extends downwards from the rear cross member 24 of the sub-frame 20.

Supported in the sub-frame 20 is a carriage 40, comprising a rectangular framework of two side members 42 and front and rear cross-members 44 and 46. Each side member 42 carries two wheels 48 which run along a track 50 in the adjacent channel-section side member 22 of the sub-frame 20, so that the carriage 40 can move along the sub-frame 20 in a direction parallel to the side members 22. A pair of arms 52 extend downwards from the carriage 40, each arm 52 being rigidly fixed at one of the side members 42 of the carriage. A horizontal shaft 54 extends between and is supported by the lower ends of the arms 52, and carries two pairs of rollers 56 rotatable on the shaft. Each pair of rollers 56 is positioned to engage a keg on a pallet at the unloading station, with the sub-frame 20 in the lowered position as shown in FIG. 2, and the rollers may be frusto-conical as shown in the drawings, to engage the barrel-shaped surface of the keg.

The carriage 40 can be moved along the sub-frame 20 by means of two double-acting air cylinders 60. Each air cylinder 60 is connected to a bracket 62 fixed to the rear cross-member 24 of the sub-frame 20 and has its piston connected to a bracket 64 fixed to the front cross-member 44 of the carriage 40.

The ramp 18 is pivoted, at its end adjacent the keg conveyor 14, to the main frame 10 for rotation about a horizontal axis 19 parallel to the keg conveyor. The ramp 18 can be moved between a lowered position, shown in FIG. 2, in which the end of the ramp engages the upper surface of a pallet at the unloading station and a raised position, shown in FIG. 1, in which the ramp is clear of the pallet. The movement is effected by two air cylinders 66, one at each side of the ramp 18. Each air cylinder 66 acts between a bracket 68 fixed to the side member 34 of the main frame 10 and a bracket 70 fixed to the ramp 18. The ramp 18 has two side guides 72 extending upwards near each side of the ramp. The side guides 72 have portions 74 which extend from the ramp 18 towards the unloading station and which are inclined laterally outwards, to guide kegs as they are moved onto the ramp.

In operation of the apparatus, with the sub-frame 20 and the ramp 18 in their upper positions, a pallet 100, loaded with four kegs 102 arranged in two rows of two, is moved on pallet conveyor 12 to the first position at the unloading station. The ramp 18 is lowered to engage the upper face of the pallet. With the carriage 40 in its rearmost position, the sub-frame 20 is lowered, by operation of the cylinders 32, so that the shaft 54 and rollers 56 are inserted between the two rows of kegs 102. The air cylinders 60 are then actuated to move the carriage 40 along the sub-frame 20. The first row of kegs 102 are pushed by the rollers 56 up the ramp 18 and onto the chains 15 of keg conveyor 14. During this movement, the freely rotatable rollers 56 allow the kegs to rotate, so that they can roll over the ramp 18. The carriage 40 is rotated, to move the rollers 56 out of engagement with the kegs, and the sub-frame 20 is raised to its uppermost position as the carriage 40 completes its rearward movement. During this movement, the kegs on the conveyor 14 are discharged from the apparatus, and the pallet 100 is allowed to move forward on the conveyor 12 to the second position at the unloading station, the ramp 18 being raised to allow this movement and then lowered to engage the pallet again. The sub-frame 20 is then lowered again, and the carriage 40 moved to push the remaining kegs 102 up the ramp and onto the keg conveyor 14, on which they are discharged. The sub-frame 20 and carriage 40 are then returned to their initial positions, the ramp 18 is raised, and the empty pallet 100 is discharged on the conveyor 12 as the next loaded pallet is moved to the unloading station.

The described apparatus thus enables kegs to be removed from a pallet by rolling them from the pallet onto the discharge conveyor, thus avoiding shock loads to which kegs can be subject in conventional depalletising equipment. Damage to the kegs is therefore avoided, and the apparatus can be made quieter in operation than conventional equipment.

The operation of the various parts of the apparatus can be controlled automatically using well-known techniques, e.g. employing photoelectric sensors to detect movement of the pallet and kegs during the unloading cycle.

Referring to FIGS. 6 to 8, apparatus for loading cylindrical articles such as kegs onto a pallet comprises a main frame 210, a pallet conveyor 212 on which pallets are moved to and from a loading station, a keg conveyor 214 on which kegs are moved to the loading station, a transfer mechanism 216 for transferring kegs from the keg conveyor to a pallet at the loading station, and a ramp 218 bridging the gap between the keg conveyor and the pallet. The illustrated apparatus is designed to load kegs 302 onto a pallet 300 in two rows of two with the kegs lying on their sides.

The pallet conveyor 212 is a chain conveyor having an upper horizontal run 213 extending through the loading station. Two stop mechanisms, such as peg stops 280 and 281, are provided to arrest each pallet 100 at respective first and second positions at the loading station, to receive each of the two rows of kegs.

The keg conveyor 214 is a chain conveyor having a pair of chains extending in an upper horizontal run 215 and arranged to that kegs lying on their sides can be transported by the chains. The upper run 215 of the keg conveyor 214 extends at right angles to the pallet conveyor 212 at one side of the loading station, and is at a level higher than that of the pallet conveyor 212, so that each empty pallet can be carried beneath the upper run of the keg conveyor as it is moved to the loading station.

The mechanisms for guiding and driving the chains of the pallet conveyor 212 and keg conveyor 214 can be of well-known form and will not be described further.

The keg conveyor 214 is provided with an escapement mechanism (not shown) of known form, arranged to allow two kegs at a time to move to a position adjacent the loading station. A backstop assembly 290 is positioned to arrest movement of kegs on the keg conveyor 214 at a position adjacent the loading station. The backstop assembly comprises a pair of vertical plates 292, whose position is adjustable by means of air cylinders 294, to enable the apparatus to handle kegs of different heights.

A keg lift mechanism is provided for lifting kegs from the keg conveyor 214 so that they can be pushed from the conveyor as described below. The keg lift mechanism consists of two lift members 282 positioned between the chains of the upper run 215 of the conveyor, each member 282 being positioned to engage one of the two kegs resting end-to-end on the conveyor adjacent the loading station. Each lift member 282 is shaped to engage the curved surface of the keg, and is mounted on a parallel linkage so that it can move vertically between a lowered position in which it is below the level of the conveyor chains and a raised position in which its upper surface is above the chains. The lift members are raised by air cylinders 284 positioned below the keg conveyor and each acting between the main frame 210 and a lever connected to the parallel linkage of the lift member.

The transfer mechanism 216,217 comprises a pusher mechanism 217 and a lowering mechanism 216. The pusher mechanism 217 comprises a pusher 310 fixed to a carriage 312 movable horizontally in the main frame 210 by means of a double-acting air cylinder 314. The pusher 310 has two pairs of rollers 316 rotatable on a shaft 318. Each pair of rollers is positioned so as to engage one of the two kegs on the conveyor 214 adjacent the loading position.

The keg lowering mechanism 216 comprises a sub-frame 220 consisting of a rectangular framework having channel-section side members 222 joined by cross members 224. At one end the sub-frame 220 has two downwardly extending legs 226 by means of which the sub-frame 220 is pivotally supported on a horizontal pivot shaft 228 extending between two uprights 230 on the main frame 210. The sub-frame 220 can be moved between a raised position (not shown) and a lowered position, shown in FIG. 6, by means of two air cylinders 232 acting between the main frame 210 and the sub-frame 220 near the end of the sub-frame remote from the pivot shaft 228.

Supported in the sub-frame 220 is a carriage 240, comprising a rectangular framework of two side members 242 and front and rear cross-members 244 and 246. Each side member 242 carries two wheels which run along a track 250 in the adjacent channel-section side member 222 of the sub-frame 220, so that the carriage 240 can move along the sub-frame 220 in a direction parallel to the side members 222. A pair of arms 252 extend downwards from the carriage 240, each arm 252 being rigidly fixed at one of the side members 242 of the carriage. A horizontal shaft 254 extends between and is supported by the lower ends of the arms 252, and carries two pairs of rollers 256 freely rotatably on the shaft. Each pair of rollers 256 is positioned to engage a keg on a pallet at the loading station, with the sub-frame 220 in the lowered position as shown in FIG. 6, and the rollers may be frusto-conical, to engage the barrel-shaped surface of the keg.

The carriage 240 can be moved along the sub-frame 220 by means of two double-acting air cylinders 260. Each air cylinder 260 is connected to a bracket 262 fixed to the rear cross-member 224 of the sub-frame 220 and has its piston connected to a bracket 264 fixed to the front cross-member 244 of the carriage 240.

The ramp 218 is pivoted, at its end adjacent the keg conveyor 214, to the main frame 210 for rotation about a horizontal axis 219 parallel to the keg conveyor. The ramp 218 can be moved between a lowered position, shown in FIG. 6, in which the end of the ramp engages the upper surface of a pallet at the loading station and a raised position in which the ramp is clear of the pallet. The movement is effected by two air cylinders 266, one at each side of the ramp 218, each acting between the ramp 218 and the main frame 210.

In operation of the apparatus, with the sub-frame 220 and the ramp 218 in the raised position, an empty pallet 300 is moved on the pallet conveyor 212 to the first position at the unloading station, and the ramp 218 is then lowered into engagement with the upper face of the pallet. In this first position, the outer end of the ramp 218 is near the middle of the pallet, so that the first two kegs can be deposited onto the pallet at the side of the pallet furthest from the keg conveyor. The sub-frame is moved into the lowered position, and two kegs 302 are moved on the keg conveyor 214 to the position adjacent the loading station. With the carriage 240 at its forwardmost position, so that the arms 252 are in the position shown in broken lines in FIG. 7, the keg lift mechanism is operated to lift the two kegs 302 from the chains of keg conveyor 214 and the pusher mechanism is operated to push the kegs from the conveyor onto the ramp 218. As the kegs move onto the ramp 218 they are engaged by the rollers 256 of the pallet lowering mechanism 216. The carriage 240 is then moved rearwardly, to allow the kegs to roll down the ramp 218 onto the pallet, the movement of the kegs being controlled by engagement with the rollers 256. When the two kegs have been brought to rest on the pallet, the sub-frame 220 and ramp 218 are raised, and the pallet is moved to the second position at the loading station. At the same time the carriage 240 is moved back to its initial position, and two more kegs are moved into position adjacent the loading station. The sub-frame 220 and ramp 218 are lowered again, and the cycle repeated to load these two kegs onto the pallet. The sub-frame 220 and ramp 218 are raised again, and the loaded pallet discharged on the pallet conveyor 212.

The described apparatus thus enables kegs to be loaded onto a pallet by rolling them in a controlled manner from the keg conveyor onto the pallet, thus avoiding shock loads to which kegs can be subject in conventional palletizing equipment. Damage to the kegs is therefore avoided, and the apparatus can be made quieter in operation than conventional equipment.

The operation of the various parts of the apparatus can be controlled automatically using well-known techniques, e.g. employing photoelectric sensors to detect movement of the pallet and kegs during the loading cycle.

It will be appreciated that the palletizer shown in FIGS. 1 to 5 and the depalletizer shown in FIGS. 6 to 8 are similar in construction, and in particular that the arrangement of the keg conveyor and pallet conveyor and the construction of the ramp and the transfer mechanism can be the same in the two apparatuses. In accordance with a further aspect of this invention, a single apparatus may be constructed which can be operated, or readily modified to operate, both as a palletizer and as a depalletizer.

I claim:

1. Apparatus for loading cylindrical articles such as kegs onto a pallet so that the articles lie on their sides in a plurality of rows, the apparatus comprising
   (i) means providing a loading station,
   (ii) means for moving an empty pallet to the loading station,
   (iii) means for assembling a row of articles at an assembly location adjacent the loading station and at a level higher than the upper surface of a pallet at the loading station,
   (iv) a ramp arranged to extend from the assembly location to a pallet at the loading station,
   (v) pusher means for pushing a row of articles onto the ramp whereby the articles roll down the ramp under their own weight onto the pallet, and
   (vi) a transfer mechanism having a carriage and a transfer member, the carriage being movable toward and away from said assembly location and movable between a lower position in which the transfer member is able to engage articles on the ramp and an upper position where the transfer member is clear of articles on the ramp and clear of articles on the pallet at the unloading station, and the transfer member further including means for moving the carriage to enable the transfer member to engage in turn each row of articles pushed onto the ramp and control the movement of the articles down the ramp.

2. The apparatus according to claim 1, wherein the transfer mechanism further includes
   a sub-frame,
   the carriage being mounted in the sub-frame so as to be movable relative to the sub-frame in a direction towards and away from said assembly location, and the sub-frame being pivotable about a horizontal axis at right angles to such movement of the carriage to effect up and down movement of the carriage.

3. The apparatus according to claim 2, wherein
   said horizontal axis is situated at the side of the assembly location remote from the loading station.

4. The apparatus according to claim 1, wherein
   said means for assembling a row of articles at the assembly location has an infeed conveyor on which articles are carried to said assembly location.

5. The apparatus according to claim 4, wherein
   the means for moving an empty pallet to the loading station is a conveyor extending at right angles to the infeed conveyor,
   and the apparatus further includes
   means for arresting movement of a pallet on the conveyor at a plurality of predetermined positions in each of which the pallet is positioned to receive a respective row of articles from the ramp.

6. The apparatus according to claim 5, further including
   means for moving the ramp between a position in which it engages the upper face of a pallet at the loading station and a raised position in which the ramp is clear of the pallet.

* * * * *